United States Patent [19]
Ko et al.

[11] Patent Number: 5,316,709
[45] Date of Patent: May 31, 1994

[54] METHOD OF MAKING A DIPPER STICK FOR AN EXCAVATOR FROM HIGH STRENGTH POLYMERIC COMPOSITE MATERIALS

[75] Inventors: Jae I. Ko; Jae W. Lee; Yoon M. Lee; En J. Jean; Chun K. Kim; Jin Kim, all of Changwon, Rep. of Korea

[73] Assignee: Samsung Heavy Industries Co., Ltd., Rep. of Korea

[21] Appl. No.: 963,564

[22] Filed: Dec. 11, 1992

Related U.S. Application Data

[62] Division of Ser. No. 728,100, Jul. 10, 1991, Pat. No. 5,245,770.

[30] Foreign Application Priority Data

Jul. 13, 1990 [KR] Rep. of Korea .................... 90-10658
Jun. 22, 1991 [KR] Rep. of Korea .................... 91-10418

[51] Int. Cl.$^5$ ............................................. B29C 67/20
[52] U.S. Cl. ..................... 264/51; 264/101; 264/152; 264/257; 264/263; 264/321; 156/172
[58] Field of Search ............ 264/102, 313, 314, 321, 264/257, 263, 51, 152, 169, 172, 101

[56] References Cited

U.S. PATENT DOCUMENTS

| | | | |
|---|---|---|---|
| 2,870,793 | 1/1959 | Bailey | 138/78 |
| 3,331,177 | 7/1967 | Godfrey | 52/376 |
| 3,977,548 | 8/1976 | McCannon et al. | 214/138 |
| 4,069,637 | 1/1978 | Braithwaite | 52/726 |
| 4,268,571 | 5/1981 | McCarthy | 428/236 |
| 4,335,182 | 6/1982 | Brand et al. | 264/321 |
| 4,340,226 | 7/1982 | Haines | 273/73 |
| 4,392,314 | 7/1983 | Albrecht et al. | 37/103 |
| 4,602,466 | 7/1986 | Larson | 52/309 |
| 4,673,102 | 6/1987 | Bullock, Jr. | 220/457 |
| 4,762,740 | 8/1988 | Johnson et al. | 264/266 |
| 5,009,821 | 4/1991 | Weaver | 264/257 |
| 5,035,602 | 7/1991 | Johnson | 264/257 |
| 5,041,260 | 8/1991 | Johnson et al. | 264/257 |
| 5,045,251 | 9/1991 | Johnson | 264/257 |
| 5,151,483 | 9/1992 | Harasin et al. | 264/257 |
| 5,152,856 | 10/1992 | Thein et al. | 264/321 |

FOREIGN PATENT DOCUMENTS

58-096522 6/1983 Japan .................... 264/263

*Primary Examiner*—Allan R. Kuhns
*Attorney, Agent, or Firm*—Price, Heneveld, Cooper, DeWitt & Litton

[57] ABSTRACT

A manufacturing method is provided from manufacturing a dipper stick having a box shaped structure including an outer casing member formed of a high strength polymeric composite materials, an inner filler comprising polyurethane foam and disposed inside the outer casing member in order to be integrated with the outer casing member, and a plurality of bushing holders made of polymeric composite material and disposed at respective connecting portions of the box shaped structure in order to be integrated with the box shaped structure. The dipper stick is configured to be connected at the respective connecting portions to a bucket, a boom, dipper and bucket cylinders and a link, respectively. The manufacturing method includes the steps of: forming each bushing holder by a filament winding process and forming the inner filler of polyurethane foam; assembling each bushing holder with the inner filler in order to provide a first assembly; arranging the first assembly in a cavity of a mold of a resin transfer molding system; and then forming the box shaped structure by a resin transfer molding process in which liquid polymeric material is transferred to the mold and a curing treatment is carried out.

10 Claims, 6 Drawing Sheets

METHOD OF MAKING A DIPPER STICK FOR AN EXCAVATOR FROM HIGH STRENGTH POLYMERIC COMPOSITE MATERIALS

This is a division of application Ser. No. 07/728,100, filed Jul. 10, 1991 now U.S. Pat. No. 5,245,770.

BACKGROUND OF THE INVENTION

1. Field of the Invention

The present invention relates to a dipper stick, a part of an excavator, and more particularly to a dipper stick, made of polymeric composite materials such as a fiber reinforced plastics, capable of improving excavation capacity as a result of reducing its own weight, and reducing manufacturing processes therefor in comparison with conventional structural steel dipper sticks simultaneously with having an optimal strength.

2. Description of the Prior Art

Figure 1:
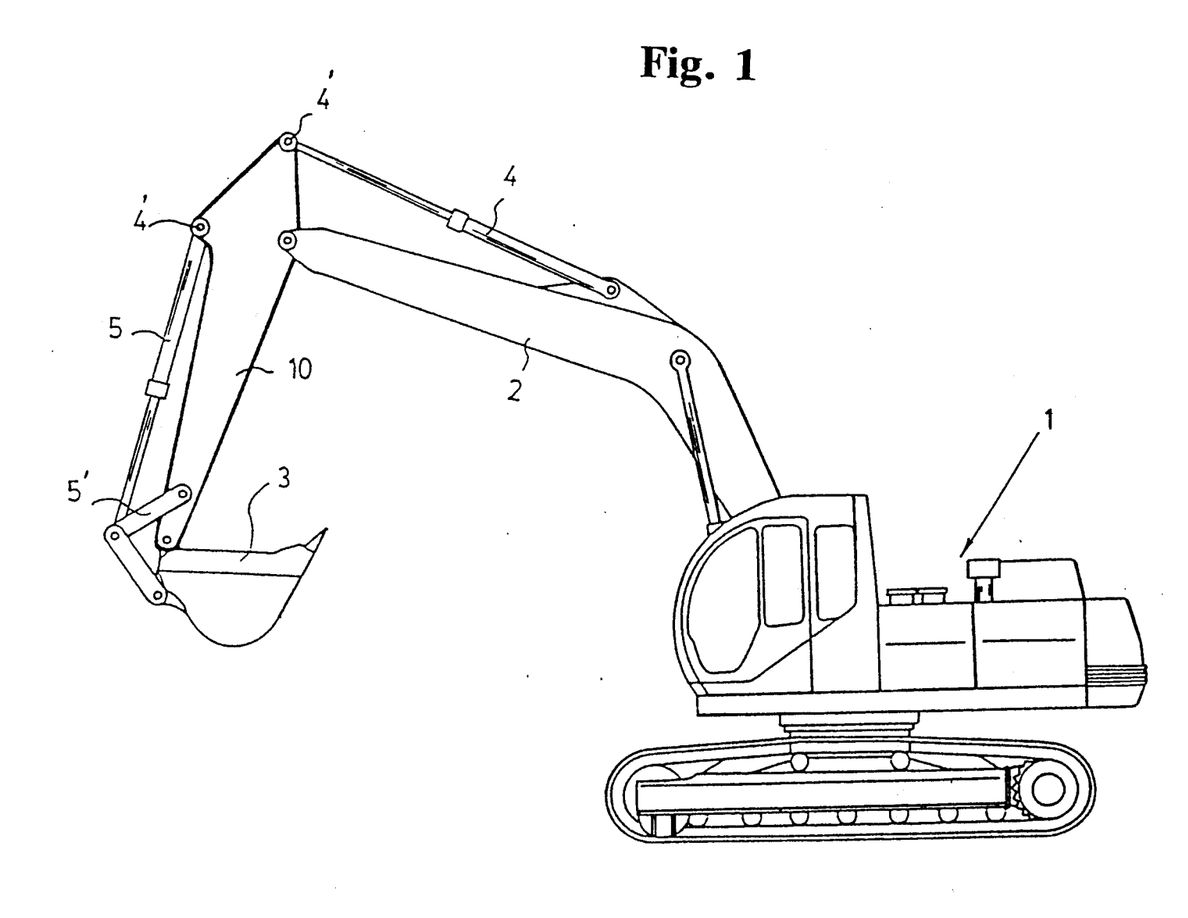
FIG. 1 is a side view of an excavator equipped with a dipper stick.

As shown in FIG. 1 which is a perspective view of a conventional excavator having the dipper stick, the dipper stick 10 is a part hingewise connected at both ends thereof to a boom 2 and an excavating bucket 3, respectively, in order to be connected to and support them, said boom 2 adapted for supporting the excavating load. The dipper stick 10 is also connected to hydraulic cylinder actuators, a dipper cylinder 4 and a bucket cylinder 5, which cylinder 4 and 5 are telescopically actuated by a hydraulic controller (not shown) generally provided at the car body 1, thereby providing the excavating power for the excavating bucket 3. Therefore, the dipper stick 10 is necessarily subjected to the repeated intensive up-and-down and turning movement in accordance with the repeated telescopic motion of the hydraulic cylinders 4 and 5. In result, the dipper stick 10 is known as an intensive movement part together with the excavating bucket 3 so that the dipper stick 10 has to be manufactured of materials capable of providing a strength enough to withstand abrasion and mechanical shock encountered in the repeated excavating operation and support the excavation load.

Generally, known dipper sticks have been, therefore, manufactured of structural steels, for example SS41, to correspond to the above-mentioned mechanical conditions. However, the structural steel dipper stick has disadvantages in that it has a considerably heavy weight caused by the relatively larger specific gravity of the structural steels, 7.9 g/cm$^3$, and a hollow box shaped and welded structure resulting in making the dipper stick be relatively weak for the outside mechanical shock, and also a weak resistance against the consume such as due to the repeated excavating operation and a weak resistance against corrosion such as due to atmosphere and moisture. Furthermore, the steel dipper stick in accordance with the prior art has the most serious disadvantage in that it needs relatively larger sizes of car body, relatively larger hydraulic power and lager necessary engine capacity for providing the desired practical excavation capacity of the excavator, caused by the above-mentioned heavy weight thereof.

SUMMARY OF THE INVENTION

The inventors of this invention have studied for a few years in order to develop a dipper stick capable of reducing the weight thereof simultaneously with having a strength enough to support the necessary excavation load, thereby solving the above-mentioned disadvantages encountered in the structural steel dipper stick according to the prior art. In result, the inventors have invented a dipper stick for an excavator made of high strength polymeric composite materials (hereinafter, referred to simply as "composite materials").

It is, therefore, an object of the present invention to provide a dipper stick for an excavator made of composite materials capable of reducing the weight thereof simultaneously with having the strength enough to support the excavation load, thereby reducing the respective sized of the car body and the necessary engine capacity in comparison with the desired excavation capacity, and in result increasing the practical excavation capacity of the excavator.

It it other object of the present invention to provide a method for manufacturing the dipper stick made of the composite materials.

In one aspect, the present invention provides in an excavator comprising a car body, a boom, a excavating bucket, dipper and bucket cylinders each for transmitting the excavation power from a hydraulic controller of said car body to said excavating bucket, a link, and a dipper stick connected to said boom and said bucket at both ends thereof, said dipper stick comprising: a box shaped structure including an outer casing member formed of a high strength polymeric composite materials and an inner filler comprising polyurethane foam and disposed inside said outer casing member in order to be integrated with said outer casing member; and a plurality of bushing holders made of polymeric composite material and disposed at connecting portions of said box shaped structure in order to be integrated with said structure, said Dipper Stick connected at said connecting portions to said bucket, said boom, said dipper and bucket cylinders and said link, respectively.

In other aspect, the present invention provides a manufacturing method for a dipper stick comprising a box shaped structure including an outer casing member formed of a high strength polymeric composite materials, and an inner filler comprising polyurethane foam and disposed inside said outer casing member in order to be integrated with said outer casing member, and a plurality of bushing holders made of polymeric composite material and disposed at respective connecting portions of said box shaped structure in order to be integrated with said box shaped structure, said dipper stick connected at said respective connecting portions to a bucket, a boom, dipper and bucket cylinders and a link, respectively, said manufacturing method comprising the steps of: forming each said bushing holder by a filament winding process and forming said inner filler comprising said polyurethane foam; assembling each said bushing holder with said inner filler in order to provide a first assembly; arranging said first assembly in a cavity of a mold of a resin transfer molding system, and then forming said box shaped structure by a resin transfer molding process in which liquid polymeric material is transferred to said mold and a curing treatment is carried out.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figures 2A, 2B:
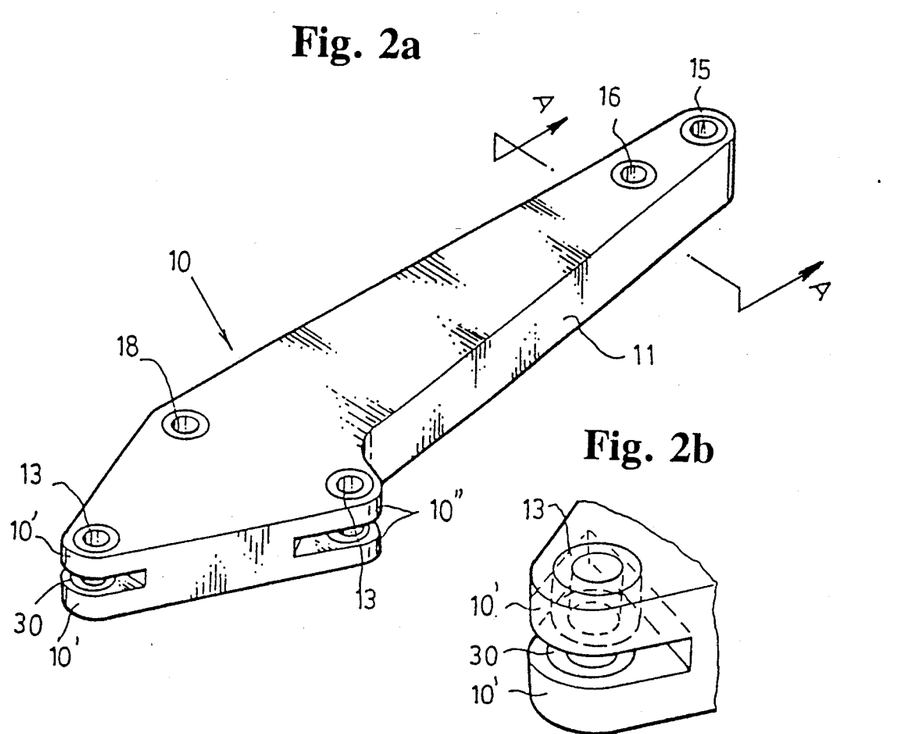
FIGS. 2A and 2B are a perspective view of an embodiment of a dipper stick for the excavator made of composite materials in accordance with the present invention and an enlarged perspective view of the dipper stick of FIG. 2A, respectively.
Figure 3:
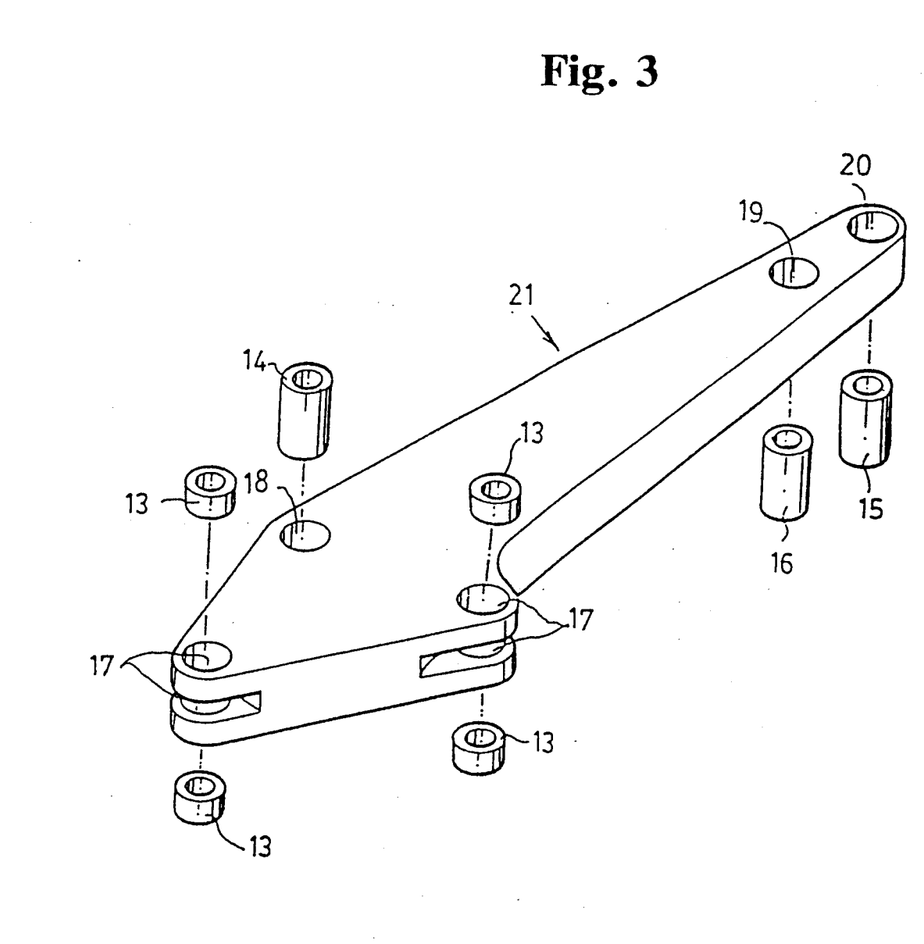
FIG. 3 is an exploded perspective view of the dipper stick of FIGS. 2 before being subjected to a resin transfer molding process.

Referring now to FIGS. 2 to 4, FIG. 2A is a perspective view of an embodiment of a dipper stick for the excavator made of composite materials in accordance with the present invention, and FIG. 2B is an enlarged perspective view of a lug flange of the dipper stick of FIG. 2A. FIG. 3 is an exploded perspective view of the dipper stick of FIGS. 2 before being subjected to a resin transfer molding process (referred to simply as "RTM process"). FIGS. 4A and 4B each is sectioned perspective view taken along the line A—A of FIG. 2A, and showing respective embodiments of an inner filler comprising polyurethane foam and fiber reinforcement. The Dipper Stick 10 has the conventional box-shaped structure, but includes an outer casing member 11 made of the composite materials. The dipper stick 10 comprises the outer casing member 11 (hereinafter, referred to simply as "casing member") and the inner filler 21 disposed in said casing member 11 as shown in FIGS. 2 and 3. The casing member 11 is formed as covering the inner filler 21 by means of the RTM method by using the composite materials such as a fiber reinforced plastics (hereinafter, referred to simply as "FRP"). The inner filler 21 is adapted for supporting the shape of the casing member 11 and absorbing a mechanical shock which may be dealt on the casing member 11. In addition, the inner filler 21 comprises the polyurethane foam 21' and the fiber reinforcement 12 deposited on said polyurethane foam 21', and is provided by an auxiliary process, which process will be more detailedly described later. The casing member 11 is integrally formed with the previously provided inner filler 21 by means of the composite materials during the RTM process.

On the other hand, the dipper stick 10 is provided with a pair of U-shaped lug flanges 10' and 10" by forming respective slot 22 at respective connecting portions thereof with the dipper cylinder 4 and the bucket cylinder 5, an end of each said cylinder 4, 5 received by each corresponding slot 22. Each lug flange 10', 10" is provided with a pair of pipe-shaped bushing holders 13 which each comprises a filament layer of the composite materials and is adapted for receiving a hinge pin 4', said hinge pins 4' adapted to connect said dipper stick 10 to the hydraulic cylinders 4 and 5, respectively. In addition, the dipper stick 10 is provided with a plurality of bushing holders 14, 15 and 16 at connecting portions thereof with the boom 2, the bucket 3 and a line 5', respectively. Each bushing holder 14, 15, 16 comprises a structural steel pipe and composite material filament tightly densely wound on said structural steel pipe in order to have bout 10 mm thickness. All the bushing holder 13, 14, 15 and 16 are previously formed by the filament winding process, which process will be more detailedly described later, and then disposed at respective positions of the inner filler 21, in turn subjected to the RTM process, thereby being integrated with the casing member 11.

Figure 4A:
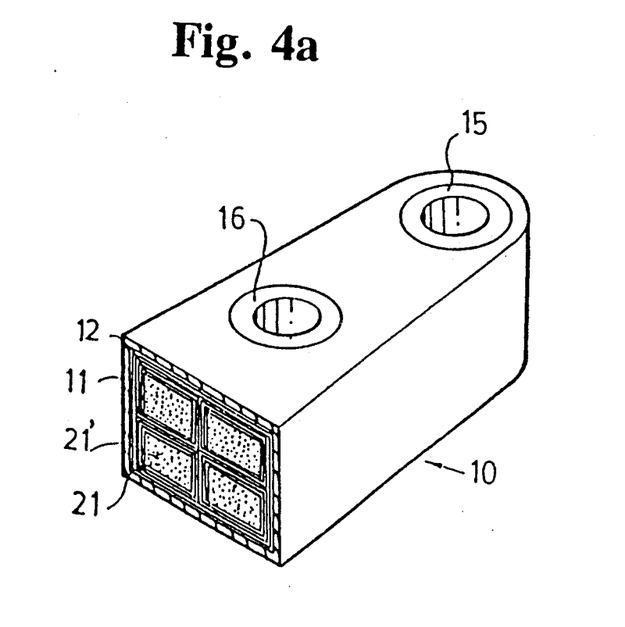
FIGS. 4A and 4B each is sectioned perspective view taken along the line A—A of FIG. 2A, and showing respective embodiments of an inner filler comprising 4 blocks of polyurethane foam and fiber reinforcement.
Figure 4B:
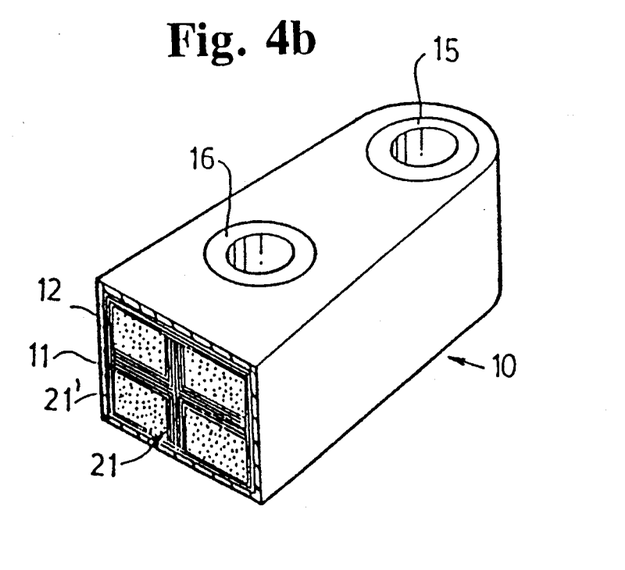

The inner filler 21 comprises a plurality of polyurethane foam 21' and fiber reinforcement 12 wound on said polyurethane foam 12 as shown in FIGS. 4A and 4B so that the inner filler 21 has the cross-shaped or check-shaped section, thereby improving the strength and the shock resistance of the inner filler 21. The fiber reinforcement 12 comprises a glass fiber, an aramide fiber and/or a carbon fiber. This inner filler 21 will be again detailedly described later.

The first embodiment of dipper stick above described is manufactured by the following processes.

Figure 5:
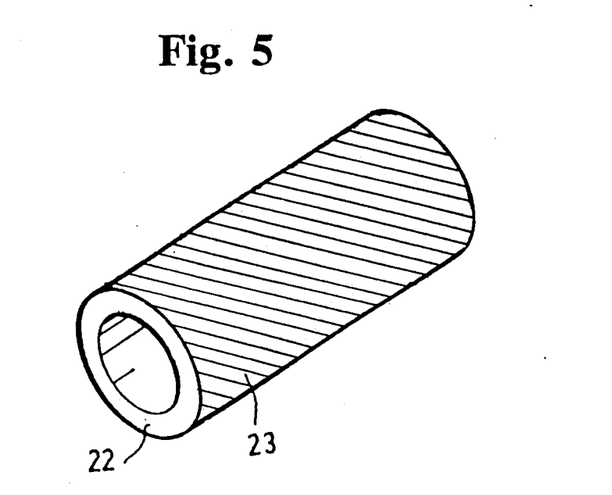
FIG. 5 is a schematic perspective view showing the 45° filament winding state, an example of a filament winding method, for forming each bushing holder of FIG. 3.

In manufacturing, the bushing holders 13, 14, 15 and 16 together with the inner filler 21 are first formed. As shown in FIG. 5 which is a schematic perspective view showing the 45° filament winding method, an example of the filament winding method, each bushing holders 13, 14, 15, 16 is formed by the filament winding method in which a continuous fiber 23 impregnated with resin is densely tightly wound on a structural steel pipe mandrel 22, and then subjected to the room temperature curing treatment. Each bushing holder 13, 14, 15, 16 may comprise the structural steel pipe mandrel 22 and the impregnated fiber 23 wound on said mandrel 22 and room temperature cured or only the impregnated fiber 23 provided by removing said mandrel 22 after accomplishing the room temperature curing treatment, as demanded. In addition, the bushing holders 13, 14, 15 and 16 may be formed as any angle filament winding method including 90° filament winding method, as required, said 90° winding method known as the Hoop winding method. In the 90° Hoop filament winding method, the impregnated continuous fiber 23 is wound on the mandrel 22 in 90° angle to the lengthwise axis of said mandrel 22. The filament winding method for manufacturing each bushing holder 13, 14, 15, 16 will be detailedly described in the following Example 1. In accordance with this Example 1, there is provided each bushing holder comprising the structural steel pipe mandrel 22 and the impregnated continuous fiber 23 wound on said mandrel 22 in accordance with the 90° filament winding method. However, the filament winding method may adopt a spiral winding method with any winding angle, as above mentioned.

Example 1

A mandrel is provided as a structural steel pipe bushing holder having the 4 mm thickness, which 4 mm thickness is ¼ of the general thickness of the conventional bushing holder, thereby reducing its own weight. On the mandrel, Z 303 LBO continuous filament (tensile strength: 400 Kgf/mm, elastic modulus: 50 msi), commercially obtained from Nippon Carbion Co. of Japan, impregnated with room temperature curing type unsaturated polyester resin or room temperature curing type vinyl ester resin is tightly densely wound by means of a filament winding machine manufactured by Korea Institute of Machinery and Metals' Laboratory. Thereafter, the mandrel wound with the impregnated filament is subjected to the room temperature curing treatment. At this time, the winding condition comprises the 10 Kgf tensile force and the 90° Hoop filament winding method, and the room temperature curing treatment is carried out for 3 hours at 24° C. temperature.

In accordance with the Example 1, a bushing holder having a strength enough to support the tensile force urged thereto is obtained.

On the other hand, the bushing holders 13 and 13, provided to the first embodiment of dipper stick 10 at the U-shaped lug flanges 10' and 10", each is formed as being relatively shorter than the other bushing holders 14, 15 and 16.

In manufacturing the inner filler 21, the polyurethane foam 21' is first formed by expansion of polyurethane prepreg having poured into an expansion mold, which mold is made of a FRP and includes a cavity having volumes ranging about 70%–about 80% of the whole volume of the dipper stick 10. Thereafter, the polyurethane foam 21' is lengthwise divided into four equal parts, which parts each is then wound with the fiber reinforcement 12 comprising the glass fiber, the aramide fiber and/or the carbon fiber. At this time, the fiber reinforcement 12 may be totally wound on each equally divided polyurethane foam 21' in order to reinforce all of the four lengthwise surfaces thereof as shown in FIG. 4A, while the fiber reinforcement 12 may be also partially deposited on the two inner surfaces of each divided polyurethane foam 21' as shown in FIG. 4B. Thereafter, all of the divided polyurethane foam 21' provided with the fiber reinforcement 12 are combined into the initial state, and then again wound with the fiber reinforcement 12 comprising the glass fiber, the aramide fiber and/or the carbon fiber so that the inner filler 21 has the cross-shaped section or the check-shaped section. The inner filler 21 is then subjected to a drilling process for providing a plurality of mounting holes 17, 18, 19 and 20 each for receiving each bushing holder 13, 14, 15, 16, and two slots 22 each for providing each U-shaped lug flange 10', 10". However, the mounting holes 17, 18, 19 and 20 and the slots 22 may be formed simultaneously with foaming the polyurethane foam 21' by means of an expansion mold provided with auxiliary molds adapted for forming said holes 17, 18, 19 and 20 and said slots 22. In result, the inner filler 21 having the outer shape shown in FIG. 3 and the sectional structure shown FIG. 4A or 4B.

Thereafter, each bushing holder 13, 14, 15, 16 is disposed in each corresponding mounting hole 17, 18, 19, 20 of the inner filler 21 in order to provide a first assembly.

The first assembly comprising the bushing holders and the inner filler is then subjected to the RTM process (see FIG. 6) in order to accomplish the dipper stick 10 of the composite materials. An example of the RTM process will be described in the following Example 2.

Example 2

Figure 6:
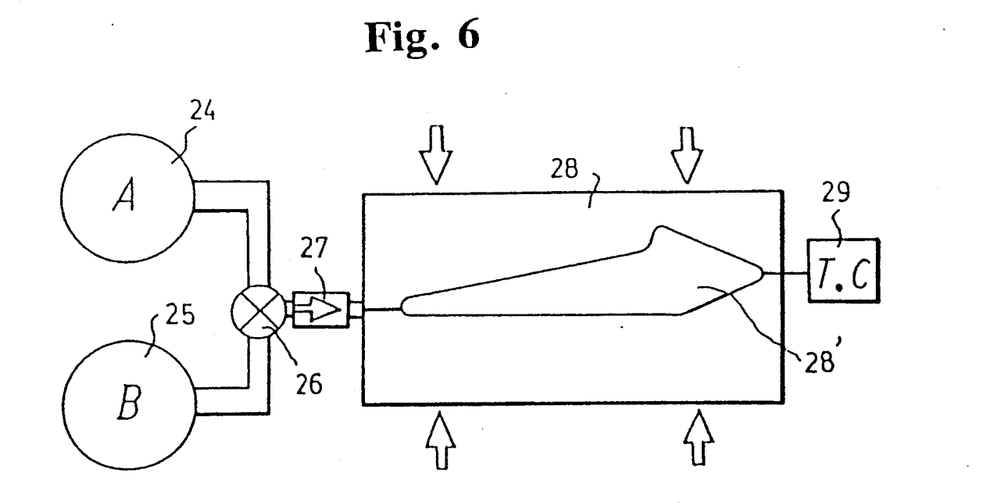
FIG. 6 is a schematic view showing a resin transfer molding system, a system for carrying out the last process of the processes for manufacturing the dipper stick in accordance with the present invention.

As shown in FIG. 6, the RTM system generally comprises a pair of resin reservoirs 24 and 25 for storing A resin and B resin, respectively, resin transfer controllers 26 and 27 sequentially communicated with said resin reservoirs 24 and 25 and adapted for controlling the resin transfer, a mold 28 communicated with the resin transfer controller 27 and comprising an upper mold and a lower mold, and a temperature controller 29 adapted for controlling the forming temperature for said mold 28. The mold 28 is provided with a cavity 28' between the upper mold and the lower mold thereof, which cavity 28' has the shape and the size each corresponding to the dipper stick 10. In the RTM process, the first assembly comprising the inner filler 21 provided with the bushing holders 13, 14, 15 and 16 is first arranged in the cavity 28' of the mold 28. Thereafter, the composite materials, that is to say the liquid polymeric resin such as the above-mentioned vinyl ester resin or the unsaturated polyester resin, mixed with the conventional additives such as a catalyst, an accelerator, a promotor, a gelling retarder and the like is transferred from the respective resin reservoirs 24 and 25 to the mold 28 by way of the resin transfer controllers 26 and 27 for about 5–10 minutes under the vacuum state inside the mold 28. At this time, the resin transfer pressure is set below about 5 Bar. Thereafter, the mold 28 is subjected to a thermal curing treatment for about 30–40 minutes under the vacuum state. In result, the composite material dipper stick 10 according to this invention is provided. During the above RTM process, simultaneously with dense filling the minute spaces each provided between each bushing holder 13, 14, 15, 16 and each corresponding mounting hole 17, 18, 19, 20 of the inner filler 21 the composite materials transferred into the mold 28 forms the casing member 11 on the whole outer surfaces of the inner filler 21, said casing member 11 having a predetermined thickness and integrated with said inner filler 21. In addition, the respective composite materials forming the parts of the dipper stick 10 each formed during the RTM process comprise the DERAKANE 411-45 vinyl ester resin commercially obtained from the Dow Chemical Co. of U.S.A. and the UNIFILO ® U 814 or U 750 glass fiber mat commercially obtained from the Vetrotex Co. of U.S.A.. The DERAKANE 411-45 vinyl ester resin has desirable vescosities ranging from about 400 mPa.s to about 500 mPa.s, more preferably 450 mPa.s. The resin transfer pressure may be desirably less than about 5 Bar or adopt the vacuum state inside the mold 28. It is very desirable to provide the vacuum state for the mold 28 during the resin transferring because the vacuum state inside the mold 28 facilitates the impregnation of the composite materials into the fiber reinforcement 12 wound on the polyurethane foam 21' of the inner filler 21 disposed in the cavity 28' simultaneously with facilitating the resin transfer from the reservoirs 24 and 25 to the mold 28. In this RTM process, the additives are used as follows: methylethylketone peroxide (MEKP) such as the Butanox LPT commercially obtained from the Akzo Co. of the Netherlands as the catalyst; diethylaniline, dimethylaniline or dimethylacetoacetamide as the accelerator; cobalt Naphthenate as the promotor; and 2.4-pentanedion as the gelling retarder.

In accordance with the Example 2, the composite material dipper stick 10 having the good strength and the relatively light weight together with the fine appearance.

Figure 7:
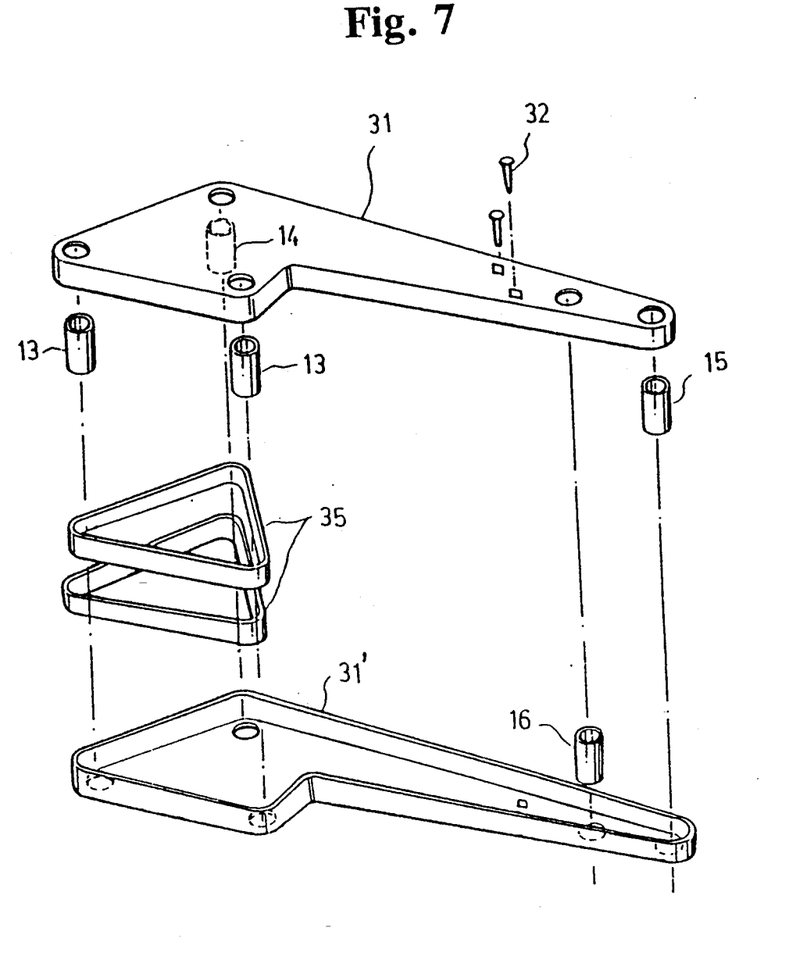
FIG. 7 is a view corresponding to FIG. 3, but showing another embodiment of a dipper stick made of composite materials in accordance with the present invention.

Turning next to FIG. 7 which is an exploded perspective view showing a second embodiment of a dipper stick 10 of composite materials in accordance with the present invention, this composite material dipper stick 10 comprises the casing member 11, the inner filler 21 disposed inside said casing member 11, upper and lower panels 31 and 31' disposed between said casing member 11 and said inner filler 21, and a flange wound on said flange in accordance with a tape winding method. The upper and lower panels 31 and 31' each is previously formed by a vacuum bag molding method and then covers the inner filler 21. The panels 31 and 31' are then wound with a prepreg tape in order to provide the flange, said flange adapted to efficiently support the excavation load, and thereafter, subjected to the RTM process described in the first embodiment, thereby providing the casing member 11 of composite materials. In this second embodiment, the dipper stick 10 has the box-shaped appearance without any lug flange 10', 10" differently from the first embodiment.

This second embodiment of the dipper stick 10 also includes a pair of triangular reinforcing rings 35 each disposed as surrounding the three bushing holders 13 and 14 arranged at the respective mounting holes 17 and 18 of the connection portion of said dipper stick 10, at said portions said dipper stick 10 connected to the boom 2, each said bushing holder 13, 14 formed by the same filament winding method as that of the first embodiment but having the same length with each other because of having no lug flange 10', 10" differently from the first embodiment. Each triangular reinforcing ring 35 is previously formed by the filament winding method and auxiliary adapted for reinforcing the bushing holder 13 and 14, thereby making the bushing holders 13 and 14 to withstand the tensile stress encountered in the excavating operation.

In this second embodiment, the filament winding method for providing the bushing holders 13, 14, 15 and 16 and the triangular reinforcing ring 35 together with the foaming method for providing the inner filler 21 are the same as those of the first embodiment, therefore, the detailed descriptions for these methods can be referred to those of the first embodiment. On the other hand, the vacuum bag molding method for providing the upper and lower panels 31 and 31' and the tape winding method for providing the flange will be more detailedly described in the following Example 3, an example for representing a manufacturing process for the second embodiment of the dipper stick 10.

Example 3

The upper and lower panels 31 and 1' each is initially formed as depositing a prepreg tape in correspondence with the designed shape of each panel 31, 31', said prepreg tape comprising the NEG glass fiber commercially obtained from the Nippon Electric Glass Co. of Japan and the Epoxy resin commercially obtained from the Gook Do Chemical Co. of the Republic of Korea. Thereafter, each initially formed panel 31, 31' is sealtightly covered with a film bag, said film bag comprising the Nylon 66 film commercially obtained from the Airtech Co., and then subjected to a vacuum state of about 680 mmHg provided by a vacuum pump. Each panel covered with the film bag under the vacuum state is then subjected to a curing treatment in a curing overn in accordance with a predetermined curing cycle. In result, the upper and lower panels 31 and 31' corresponding to the desired mechanical and chemical conditions are obtained. On the other hand, the bushing holder 13, 14, 15 and 16 and the triangular reinforcing ring 35, each previously provided by the filament wing method, are arranged at respective positions of the previously provided inner filler 21 comprising the polyurethane foam, and then each is applied with the 2447 Packing Epoxy commercially obtained from the IPCO Co. in order to be fixedly stuck to said inner filler 21. Thereafter, the inner filler 21 provided with the bushing holder 13, 14, 15 and 16 and the triangular reinforcing ring 35 is then cased with the upper and lower panels 31 and 31'. At this time, the upper and lower panels 31 and 31' are applied with the 2447 Packing Epoxy in order to be fixedly stuck with each other and also fixedly stuck to the inner filler 21. The panels 31 and 31' enclosing the inner filler 21 are then 36 times wound with a prepreg tape having the width of about 60 mm and comprising glass fiber/epoxy resin, and then subjected to a curing process in a curing oven in order to provide a first assembly. Thereafter, the first assembly is arranged in the cavity 28' of the mold 28 of the RTM system shown in FIG. 6 and then subjected to the same RTM process as that of the first embodiment, thereby providing the casing member 11 on the first assembly. At this time, the conditions of the RTM process are the same as those of the first embodiment.

The composite material dipper stick 10 obtained in accordance with the Example 3 has the similar properties to those of the dipper stick 10 of the first embodiment.

Figure 8:
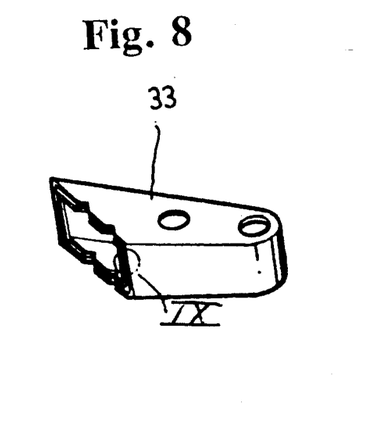
FIG. 8 is a fragmentary perspective view of an antishock/antiabrasion member configured to be fixedly mounted to a connecting portion of the dipper stick in FIG. 7.
Figure 9:
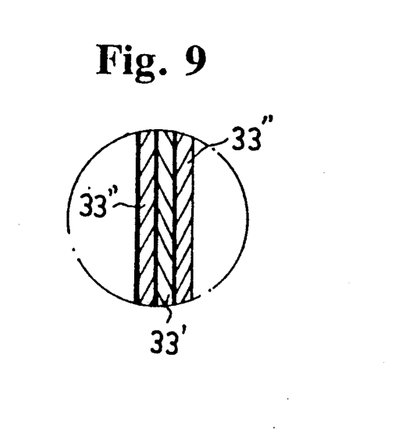
FIG. 9 is a sectional view of the wall taken from the circled are IX in FIG. 8.

In addition, the dipper stick 10 in accordance with the present invention may be provided with an antishock/antiabrasion member 33 (FIGS. 8 and 9) at the connecting portion thereof, at said connecting portion said dipper stick 10 connected to the bucket 3, so as to increase the shock resistance and the abrasion resistance of the dipper stick 10 during the repeated excavating operation. The antishock/antiabrasion member 33 comprises, as shown in FIG. 7, a porous rubber layer 33' and a pair of polyethylene deposition layers 33" disposed on and under said rubber layer 33', respectively, and fixedly mounted to the dipper stick 10 by means of a plurality of locking bolts 32.

As represented in the following table 1, the abovementioned composite material dipper stick 10 in accordance with this invention has a strength increasing about three times than that of the conventional dipper stick of the structural steel such as SS41. Furthermore, this composite material dipper stick 10 reduces it own weight in comparison with the conventional dipper stick of structural steel by about 50% in case of the small capacity of excavator and by about 60% in case of the large capacity of excavator. If these weight reductions of this composite material dipper stick 10 in comparison with the conventional dipper stick of the structural steel are converted into the weight ratio of an excavated earth which in turn means the practical improvement of the excavation capacity of the excavator, this composite material dipper stick 10 reduces it own weight than that of the conventional dipper stick by about 6.8% of the excavated earth in case of the small capacity of the excavator, and about 13.9% of the excavated earth in case of the large capacity of the excavator. In result, the dipper stick according to this invention provides the same excavation capacity as that of the conventional dipper stick of the structural steel for the excavators, while it allows said excavators to be equipped with relatively smaller car body and necessary engine capacity in proportion to the weight reduction ratios on the basis of the excavated earth. On the other words, the composite material dipper stick 10 according to this invention provides an improvement in the excavation capacity of about 6.8-13.9% for the excavators in comparison with another excavators equipped with the conventional structural steel dipper stick, the same size of car body and the same capacity of engine as those of the excavators equipped with the composite material dipper stick 10 according to this invention.

Table 1: A comparing table for representing the weight reductions of the composite material dipper stick (CM D/S) in comparison with the conventional structural steel dipper stick (SS41 D/S).

| classification | size | SS41 D/S weight, Wm | CM D/S weight, Wc | weight reduction, Ws |
|---|---|---|---|---|
| small capacity | B/C: 0.22 m³ W/E, W: 770 Kg | 102 Kg Wm/W ≈ 0.132 | 50 Kg Wc/Wm ≈ 0.5 | 52 Kg Ws/W ≈ 0.068 |
| large capcity | B/C: 0.80 m³ W/E, W: 2800 Kg | 650 Kg Wm/W ≈ 0.232 | 260 Kg Wc/Wm = 0.4 | 390 Kg Ws/W ≈ 0.139 |

In the table, B/C and W/E denote the bucket capacity and the weight of an excavated earth, respectively.

As described above, the composite material dipper stick in accordance with this invention provides the weight reduction of about 50%-60% in comparison with the conventional structural steel dipper stick, and also about 6.8%-13.9% in comparison with the conventional structural steel dipper stick on the basis of the weight ratio of the excavated earth. In result, this composite material dipper stick provides an advantage of the improvement of about 6.8%-13.9% in the excavation capacity. Furthermore, this composite material dipper stick provides another advantages of improvements of the corrosion resistance, the shock resistance and the vibration resistance thereof as a result of properties of the composite materials such as FRP, the main materials of said dipper stick according to this invention, such as the relatively good corrosion resistance, good abrasion resistance and good elasticity. Therefore, the present invention provides another advantage of providing an excavator capable of desirable using at the relatively poor working place such as harbor dredging work.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A manufacturing method for a dipper stick comprising a box shaped structure including an outer casing member formed of a high strength polymeric composite material, and an inner filler comprising polyurethane foam and disposed inside said outer casing member in order to be integrated with said outer casing member, and a plurality of bushing holders made of polymeric composite material and disposed at respective connecting portions of said box shaped structure in order to be integrated with said box shaped structure, said dipper stick connected at said respective connecting portions to a bucket, a boom, dipper and bucket cylinders and a link, respectively, said manufacturing method comprising the steps of:
    forming each said bushing holder by a filament winding process and forming said inner filler comprising said polyurethane foam;
    assembling each said bushing holder with said inner filler in order to provide a first assembly; and
    arranging said first assembly in a cavity of a mold of a resin transfer molding system, and then forming said outer casing member of said box shaped structure by a resin transfer molding process in which liquid polymeric composite material is transferred to said mold and a curing treatment is carried out.

2. A manufacturing method for a polymeric composite material dipper stick as claimed in claim 1, wherein said filament winding process includes a 90° hoop winding process.

3. A manufacturing method for a polymeric composite material dipper stick as claimed in claim 1, wherein said filament winding process includes any spiral winding process having any winding angle.

4. A manufacturing method for a polymeric composite material dipper stick as claimed in claim 1, wherein said step of forming said inner filler further comprises the steps of:
    foaming said polyurethane foam;
    lengthwise dividing said polyurethane foam into four parts;
    winding a fiber reinforcement on each said divided polyurethane foam;
    combining all of said divided polyurethane foam each provided with the fiber reinforcement; and
    winding a fiber reinforcement on said combined polyurethane foam.

5. A manufacturing method for a polymeric composite material dipper stick as claimed in claim 1, wherein said step of assembling said first assembly further comprises the steps of:
    previously forming a triangular reinforcing ring by a filament winding process and forming upper and lower panels by a vacuum bag molding process;
    arranging said triangular reinforcing ring at said inner filler in order to surround a part of said bushing holders each disposed at each connecting portion of said inner filler, at each said connecting portion said dipper stick connected to said boom and said dipper and bucket cylinders;
    casing said inner filler with said upper and lower panels and sticking said upper and lower panels with each other by means of a bonding agent; and
    forming a flange on said upper and lower panels in accordance with a tape winding process.

6. A manufacturing method for a polymeric composite material dipper stick as claimed in claim 4, wherein said fiber reinforcement comprises a glass fiber, an aramide fiber and/or a carbon fiber.

7. A manufacturing method for a polymeric composite material dipper stick as claimed in claim 4, wherein said step of winding said fiber reinforcement on each said divided polyurethane foam comprises a step of depositing said fiber reinforcement on two inner lengthwise surfaces of each said divided polyurethane foam.

8. A manufacturing method for a polymeric composite material dipper stick as claimed in claim 4, wherein said step of winding said fiber reinforcement on each said divided polyurethane foam comprises a step of winding said fiber reinforcement on four lengthwise surfaces of each said divided polyurethane foam.

9. A manufacturing method for a polymeric composite material dipper stick as claimed in claim 1, wherein said polymeric composite materials used in said resin transfer molding process comprises a glass fiber mat as a base material and a vinyl ester resin or an unsaturated polyester resin as a main material.

10. A manufacturing method for a polymeric composite material dipper stick as claimed in claim 1, wherein said resin transfer molding process uses a pressure less than about 5 Bar or a vacuum state inside the mold as a resin transfer pressure.

* * * * *

UNITED STATES PATENT AND TRADEMARK OFFICE
CERTIFICATE OF CORRECTION

PATENT NO. : 5,316,709                                   Page 1 of 2
DATED : May 31, 1994
INVENTOR(S) : Jae I. Ko et al It is certified that error appears in the above-indentified patent and that said Letters Patent is hereby corrected as shown below:

In the Abstract, line 1;
    "from" should be -- for --;

Column 1, line 13;
    After "such as" delete -- a --;

Column 1, line 28 (second occurrence);
    "cylinder" should be -- cylinders --;

Column 2, line 10;
    "sized" should be -- sizes --;

Column 2, line 32;
    "Dipper Stick" should be -- dipper stick --;

Column 3, line 30;
    "circled are" should be -- circled area --;

Column 3, line 46;
    "Dipper Stick" should be -- dipper stick --;

Column 4, line 11;
    "line" should be -- link --;
    line 15, "bout" should read --about--.
Column 4, line 16;
    "holder" should be -- holders --;

Column 5, line 16;
    "24°" should be -- 25° --;

Column 7, line 35;
    "holder" should be -- holders --;

UNITED STATES PATENT AND TRADEMARK OFFICE
CERTIFICATE OF CORRECTION

PATENT NO. : 5,316,709
DATED    : May 31, 1994
INVENTOR(S) : Jae I. Ko et al

It is certified that error appears in the above-indentified patent and that said Letters Patent is hereby corrected as shown below:

Column 7, line 54;
"31 and 1'" should be -- 31 and 31' --;

Column 7, line 67;
"overn" should be -- oven --;

Column 8, line 4;
"holder" should be -- holders --;

Column 8, line 12;
"holder" should be -- holders --;

Column 9, last line of Table 1;
"capcity" should be -- capacity --.

Signed and Sealed this

Thirteenth Day of December, 1994

BRUCE LEHMAN

Attest:

Attesting Officer              Commissioner of Patents and Trademarks